United States Patent [19]

Fiorentini

[11] Patent Number: 4,765,935
[45] Date of Patent: Aug. 23, 1988

[54] METHOD FOR FOAMING INSULATIONS IN REFRIGERATORS AND THE LIKE

[75] Inventor: Carlo Fiorentini, Caronno Pertusella Varese, Italy

[73] Assignee: AFROS S.p.A., Varese, Italy

[21] Appl. No.: 4,495

[22] Filed: Jan. 20, 1987

[30] Foreign Application Priority Data

Jan. 21, 1986 [IT] Italy .................. 19130 A/86

[51] Int. Cl.$^4$ .............. B29C 45/77; B29C 45/78; B29C 67/20
[52] U.S. Cl. .................. 264/40.5; 264/40.6; 264/40.7; 264/46.5; 264/46.7; 264/261; 264/334
[58] Field of Search ............ 264/40.1, 40.5, 40.7, 264/46.5, 40.61, 46.7, 261, 334; 425/145, 149, 150, 143, 144, 4 R, 817 B

[56] References Cited

U.S. PATENT DOCUMENTS

| | | | |
|---|---|---|---|
| 3,265,784 | 8/1966 | Jacobs | 264/40.5 |
| 3,628,901 | 12/1971 | Paulson | 425/136 |
| 3,859,400 | 1/1975 | Ma | 264/40.5 |
| 3,893,792 | 7/1975 | Laczo | 425/149 |
| 3,937,776 | 2/1976 | Hold et al. | 264/40.6 |
| 4,094,940 | 6/1978 | Hold | 264/40.6 |
| 4,399,105 | 8/1983 | Tilgner et al. | 425/4 R |

Primary Examiner—Willard Hoag
Attorney, Agent, or Firm—Cushman, Darby & Cushman

[57] ABSTRACT

The invention relates to a method for producing insulations of foamed plastic material, in cabinets and doors of refrigerators, freezers and the like.

According to the invention, a metered quantity of a foamable mixture is fed into the gaps between the inner and outer walls of a cabinet or door, placed in a foaming jig; the foaming process is controlled by sensing characteristic parameters, for example, the temperature of the jig, cabinet or door, or the pressure of the foaming plastic material, comparing them with reference parameters or data stored in a data processing unit. A control signal is generated to open the foaming jig and to unmold or remove the cabinet or door when at least one of the processing parameters has reached a pre-established value. The metered quantity of mixture fed in each subsequent foaming operation is corrected each time according to the changes in the peak pressure of the foam with respect to the previous foaming operation.

10 Claims, 2 Drawing Sheets

METHOD FOR FOAMING INSULATIONS IN REFRIGERATORS AND THE LIKE

BACKGROUND OF THE INVENTION

This invention relates to the production of insulations of foamed plastic material, and refers in particular to a method and an apparatus for producing foamed plastic insulations, such as foamed polyurethane, in doors and cabinets for refrigerators, freezers and the like.

We shall refer hereinafter to the production of insulations of foamed polyurethane, however it is obvious that the invention can be likewise applied and adapted for producing foamed insulations in any type of article and with any suitable type of foamable plastic material.

In the manufacturing of cabinets and doors for refrigerators, freezers and the like, which make use of a rigid foam for the insulating material, the demolding time, that is to say, the length of time the cabinet or door remains in the press or foaming jig, greatly reduces the possibility of automating and improving the manufacturing process.

In the foaming of refrigerator cabinets, for example with polyurethane material, to which reference will be made hereunder, the demolding time, that is to say, the length of time each cabinet must remain in the jig or mold until the foam has cured or reaches the desired degree of hardness, depends upon several parameters or variables of the foaming process, which include the temperature of refrigerator cabinets and the foaming jig, the percent of overpacking, or excess of quantity of polyurethane mixture fed into the gaps or space between the outer and inner walls of the cabinet or in the door.

At present, in the manufacturing of refrigerator cabinets and the like, the average demolding time or length of time the cabinet remains in the foaming jig, for a model of cabinet, is either calculated by trial and error at the beginning of each manufacturing cycle or derived from previous productions, with complicated operations which involve losses in terms of manhours and manufacturing rejects. In practice, at the start of production, trial foaming operations are carried out on a number of refrigerator cabinets, varying both the length of time in which the cabinet remains in the jig and the percent of additional charge or overpacking of mixture required in order to ensure that it is properly filled, until the foaming conditions considered suitable for that particular cabinet or article to be manufactured are reached.

According to the known manufacturing systems, the cabinets are demolded from the foaming jigs after a pre-established period of time, which remains constant throughout the entire production period; however, as the foaming conditions can vary during manufacturing, as a rule the length of time that the cabinets remain in the jigs is suitably extended so as to have a margin of safety in order to eliminate or at least reduce any possible problems to a minimum.

This results in an excessively low productivity due to the considerable length of time that cabinets remain in the foaming jigs, and insufficient utilization of the productive capacities of the plants. This mode of operating proves to be impractical and gives rise to manufacturing rejects and an excessive consumption of material; furthermore, it does not ensure the manufacturing of insulations or articles with constant uniform properties, due to the fact that certain parameters of the foaming process, in particular, the pressure exerted by the gases in the polyurethane foam, change during the production cycle. Consequently, it becomes necessary to carry out additional tests, sometimes operating with excess of overpacking and/or leaving the cabinet in the jig for excessively long periods, with respect to what would be necessary in actual fact.

In an article by W. D. Clarke in Polyurethane Marketing & Technology—SPI 28 annual conference—November 1984, pages 194 and 197, a laboratory method was proposed as an experiment in order to study the variable which affect the foaming process, considering the changes with time in the pressure of the foam inside a suitably modified Brett mold. In substance, W .D. Clarke maintained that he was able to calculate the demolding time by detecting the pressure curves of the polyols and comparing the pressure drops which occur after a given period of time has elapsed, with respect to a specimen curve, starting from the peak pressure.

Although W. D. Clarke proposes a simpler system for calculating the length of time the cabinet should remain in the foaming jig, in industrial use this does not give rise to any substantial difference due to the fact that the refrigerator cabinets will still have to be demolded after a pre-established and suitably prolonged period of time in order to make allowance for any possible changes in the parameters of the foaming process which will occur during manufacture, without any possibility of controlling the foaming process or of intervening automatically in order to vary a subsequent foaming operation.

The scope of this invention therefore is to provide a method for producing foamed plastic insulations in doors and cabinets of refrigerators, freezers and the like, by means of which it is possible to automatically control the foaming of a door or a cabinet closed in its respective foaming jig, and at the same time to establish, for each individual foaming operation, the most appropriate moment for demolding the foamed article, determining such moment each time no longer in relation to a preestablished length of time for the cabinet or door to remain in the foaming jig, but in relation to one or more suitably controlled characteristic parameters of the foaming process.

A further scope of this invention is to provide a method as defined above, which enable the total automation of the operations of foaming and removing the foamed article from the jig, making it possible to intervene from time to time and to automatically modify certain parameters of the process, for example the percent of overpacking of mixture, if necessary, in order to maintain the most appropriate foaming conditions, without having to carry out additional tests.

A still further scope of this invention is to provide a method for foaming doors and cabinets of refrigerators, freezers and the like, with which it is possible to obtain a production of insulating material with substantially uniform and constant characteristics and which at the same time reduce the length of time that each single cabinet or each single door remains in the foaming jig, thereby ensuring higher productivity, greater utilization of the plants and immediate quality control.

SUMMARY OF THE INVENTION

According to the invention, a metered quantity of a foamable mixture is fed into the gaps between the inner and outer walls of a cabinet or door, placed in a foaming jig; the foaming process is controlled by sensing characteristic parameters, for example, the temperature of the jig, cabinet or door, or the pressure of the foaming plastic material, comparing them with reference parameters or data stored in a data processing unit. A control signal is generated to open the foaming jig and to demold or remove the cabinet or door when at least one of the processing parameters has reached a pre-established value. The metered quantity of mixture fed in each subsequent foaming operation is corrected each time according to the changes in the peak pressure of the foam with respect to the previous foaming operation.

The invention will be illustrated hereunder with reference to the example of the accompanying drawings, in which.

DESCRIPTION OF THE INVENTION

Figure 1:
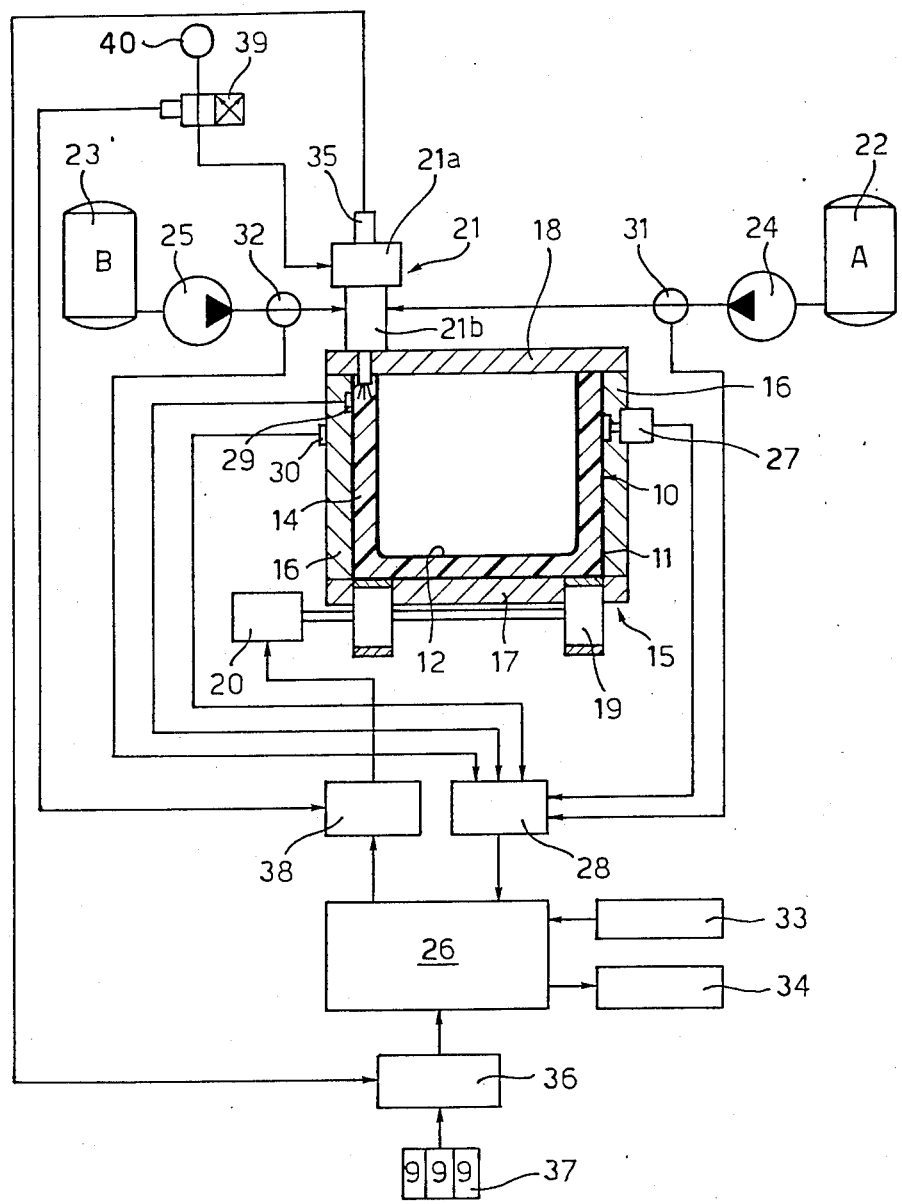
FIG. 1 shows an apparatus operating according to the method of this invention.

FIG. 1 shows a schematic representation of an apparatus for foaming a refrigerator cabinet 10 having spaced apart external walls 11 and internal walls 12, defining spaces or gaps which must be completely filled with a layer 14 of a rigid foamed plastic material made, for example, from a polyurethane foam, so as to thermally insulate and reinforce the walls of the cabinet.

The refrigerator cabinet 10 is placed, in the known way, in a foaming jig 15 having opposing outer walls 16, on all sides of the refrigerator cabinet 10, a supporting base plate 17 and a plug member 18 which penetrates into the cabinet 10 and which fits to the internal surfaces of the latter. Reference 19 shows a schematic representation of a conveyor for loading and unloading the refrigerator cabinets 10, which is driven by an electric motor 20. The foaming jig 15 can obviously be of any suitable type, and can generally be opened automatically, in a per se known way, for the introduction and removal of the individual cabinets 10.

The polyurethane mixture or foamable plastic material can be fed in any suitable way, for example, by means of a high-pressure mixing head 21 comprising a control portion 21a and a mixing chamber 21b into which the chemical components to be mixed, which are contained in tanks 22, 23, are injected under high pressure by means of their respective metering pumps 24 and 25.

The apparatus shown also comprises a processing unit or CPU 26 which controls the operation of the apparatus in relation to one or more significant parameters of the entire foaming process, such as the pressure exerted by the foam on the walls of the cabinet and the like, the temperature of the same cabinet and/or of the foaming jig or mold, in one or more prefixed points. In particular, a first pressure sensor, schematically indicated by reference 27, senses the pressure of the foam 14 developing inside the walls of the cabinet 10 and sends a pressure signal proportional to the varying value of the pressure exerted by the polyurethane foam against the walls of the refrigerator cabinet, to analog inputs 28 of the processing unit 26; a second sensor 29 and a third sensor 30 in turn send signals indicating the changes in temperature of the refrigerator cabinet 10 and, respectively, of the foaming jig 15, to analog inputs 28 of the processing unit 26.

The processing unit 26 is also provided with data relative to the rates of flow of the chemical components to be mixed, by means of flow transducers 31, 32, as shown schematically. References 33 and 34 in FIG. 1 indicate a keyboard for programming the processing unit, with reference data and a control monitor. The various temperature and pressure sensors can be of any suitable type; in particular, the pressure sensor 27 can be a normal pressure sensor which either senses the thrust exerted by the foam on the outer walls 13 of the cabinet directly, or indirectly by means of the mechanical stress exerted on the foaming jig. In any case, the various specific solutions may be determined each time in relation to the particular type of apparatus, the geometry and the configuration of the refrigerator cabinet and/or door to be foamed.

The opening and closing conditions of the mixing head 21 are controlled by a further sensor 35 whose signal is sent to the digital inputs of the processing unit 26, as shown; these inputs 36 also receive a reference signal indicating a pre-established drop in the pressure of the polyurethane foam in the refrigerator cabinet 10, during each foaming operation, for the purposes explained further on, for example by means of a decade counter 37 which can be set manually, or other suitable means.

Lastly, it can be seen from FIG. 1 that the digital outputs 38 of the processing unit 26 are operatively connected to the control circuit of the motor 20 of the conveyor 19 of the foaming jig and, respectively, to a control valve 39 for a power supply 40 of the hydraulic circuit actuating the mixing head 21. The foaming process will now be described, with reference to the graphical representation of FIG. 2, which gives in relation to time t, two curves A, B showing the variation in the process value of the pressure P exerted by the foam 14 on the internal walls of the refrigerator cabinet 10, with the variation in the foaming conditions. In particular, it is assumed that the curve A of the graphical representation of FIG. 2 corresponds to the ideal foaming curve for a given model of refrigerator cabinet and for a given formulation of polyurethane mixture, calculated for example as an average of the initial trial foaming parameters or of foamings carried out previously; it can be seen from FIG. 1 that as the foam rises, the foam pressure rises slowly until the gel time is reacted; than the pressure rises rapidly up to a peak value Pp after which the pressure of the foam will decrease; it is also assumed that the most important processing parameters are the process temperatures Tm of the foaming jig, the process temperatures Ta of the cabinet 10 and the peak pressure Pp reached by the foam at the instant tp; the point ts corresponds to the instant that the refrigerator cabinet 10 is demolded or discharged from the foaming jig 15. According to this invention, the demolding time is established in relation to a variation of a pre-established value of at least one of the processing parameters, with respect to a reference value, for example, in relation to a percent drop or reduction of the pressure with respect to the peak pressure Pp, of a pre-established value, by means of the decade counter 37. The most significant data of the foaming process, relative to the reference curve A, are stored in the memory of the processing unit 26 which contains the general programme of the apparatus. The first foaming operation will be carried out with an estimated degree of overpacking of mixture for the reference curve A; however, it is possible that the real pressure curve may differ slightly from the curve A if, for example, the system is not yet operating at full capacity and that the peak value is consequently slightly lower than the theoretical peak value Pp memorized in the processing unit 26 for the curve A; this real peak pressure value is stored in the processing unit.

Figure 2:
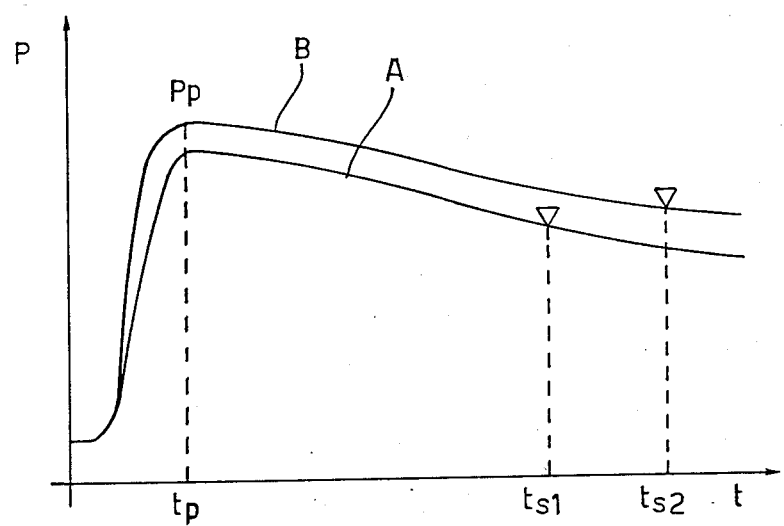
FIG. 2 is a graphic illustrating some foam pressure curves, in relation to time.

As the foaming cycle proceeds, after having passed the peak value, and as the curing or hardening of the resin begins, the pressure of the foam gradually begins to drop in accordance with curve A of FIG. 2. When the pressure P has dropped with respect to the peak pressure Pp of a value pre-established in percent in the processing unit 26, which is determined by means of the decade counter 37, the foam 14 inside the walls of the refrigerator cabinet will be considered to have hardened sufficiently and will have adhered to the internal surfaces of the walls 11 and 12 of the cabinet in such a way as to counteract and overcome the remaining pressure inside the foam itself. In other words, when the foam 14 has hardened against the internal walls 11 and 12 of the refrigerator cabinet, its mechanical strength will be sufficiently high as to overcome the residual pressure in the closed cells of the foam, and there will no longer be any danger of the cabinet swelling or warping. This condition, according to this invention, is determined as a function of one or more characteristic parameters of the foaming process controlled by the processing unit 26 and corresponds to the instant Ts1 that the cabinet is discharged from the foaming jig 15. Consequently, unlike conventional foaming systems in which the foamed articles are discharged after a pre-established period of time, which remains unchanged in the subsequent foaming operations, without any specific control during the foaming process, according to this invention the discharging only takes place in relation to certain processing parameters, which are controlled and compared with corresponding reference parameters stored in the unit 26. The discharging or demolding moment depends therefore upon the actual foaming conditions, which may be modified from time to time and adapted, if necessary, to each subsequent foaming operation, in order to bring them as close as possible to the ideal foaming conditions of curve A.

In fact, as mentioned previously, the foam pressure curve P depends both upon the temperature of the cabinet to be foamed, and upon the temperature of the foaming jig itself, as well as upon the quantity of mixture to be introduced into the gap between the walls of the cabinet, or upon the percentage of excess mixture or overpacking generally required in order to ensure a complete and correct filling and the desired characteristics in the insulating layer thus formed. Consequently, according to a further feature of this invention, in order to obtain insulating material with uniform and unchanging characteristics, and at the same time in order to avoid overfilling the refrigerator cabinets 10, that may result in a waste of material, or in underfilling them, the quantity of mixture fed into the walls of the cabinet can be controlled by the processing unit and varied in relation to one or more parameters of the foaming process, for example, by changing the percentage of overpacking according to the peak pressure reached during the foaming of a previous cabinet, and/or to the temperature of the cabinet and/or of the foaming jig itself; the quantity of overpacking or the percentage of said overpacking will be changed for example in the opposite way to the variation in the control parameter or parameters.

It is assumed in fact that, due to an increase in temperature, or for other reasons, the pressure curve for a given foaming operation proves to be the upper curve B, the peak pressure changes from the value Pp of curve A to the value Pp of curve B. It is obvious that under these conditions, with an equal pressure drop per cent, the moment the cabinet is discharged from the jig changes from Ts1 to Ts2, thereby increasing the length of time that the cabinet 10 remains in the foaming jig; the cabinet will still be discharged however when the pressure P has dropped by the same per cent value as the previous operations, under conditions considered suitable for opening the jig. As the quantity of mixture fed into the walls of the cabinet now proves to be excessive, and in order to bring the pressures and the characteristics of the layer of insulating material back to the desired levels, according to the method of this invention, the processing unit 26, sensing the previous peak value higher than that of curve A, sends a signal to the control members of the mixing head 21 to change their timing or the opening time of the head itself, thus reducing it in proportion to the variation it was subjected to by the peak pressure Pp, in order to bring the foaming condition of the subsequent cabinet back close to the foaming conditions of curve A; in this way, not only is it possible to ensure uniform and consistent results in the mass production of refrigerator cabinets, but also to save considerable quantities of insulating material.

The method according to this invention is also advantageous from another standpoint; supposing in fact that for unforeseen reasons there is a sudden change, for example, an increase in the peak pressure but that, after the peak, the curing and hardening of the foam returns once more to the optimal curve A, or a very similar curve. It is clear that under these conditions, if the demolding time ts only depended upon a per cent variation in the pressure, referred to the peak pressure of the process under way, the cabinet would be discharged at a later moment, and would remain longer in the foaming jig, or if it were to be discharged or demolded at the moment ts1 of curve A, it could present an excessively high residual pressure which would cause the cabinet to bulge. Consequently, as an alternative, it is also possible to control and to make a comparison between the peak pressure, as mentioned previously, and the residual pressure, at the moment of demolding in order to control or to change the moment that the jig opens and the cabinet is discharged. Either one of the two above-mentioned pressure values, compared with a corresponding reference value of the processing unit, can serve for controlling the packing degree to which the walls of the cabinet and/or door are filled with expanded foam, thus making it possible to immediately remedy the causes which gave rise to the irregular packing.

In practice, the apparatus operates as follows: the data relating to the most important reference parameters which are to be controlled in the foaming process are introduced in the memory of the processing unit 26 by means of the keyboard 33, and are obtained from previous foaming operations or operations specially carried out during the start-up of the system; a pre-established pressure drop per cent is defined by means of the decade counter 37, and then a cabinet 10 is introduced into the foaming jig 15 by means of the conveyor 19 controlled by the processing unit 26. On the basis of the programme memorized in it and on the basis of the data received from the various sensing means, the processing unit controls the opening time of the mixing head and then the quantity of mixture fed into the walls of the refrigerator cabinet; then, during the foaming step it controls the change in the pressure of the foam and, when said pressure has exceeded the peak value Pp and has dropped or reduced by the per cent quantity determined in the processing unit itself, for example after a pressure drop of approximately 15–20% with respect to the peak pressure, the processing unit intervenes once again to control the aperture of the foaming jig and the discharge of the refrigerator cabinet by means of the conveyor 19. The signal of peak pressure of the foaming operation under way and any other important parameters of the foaming process carried out, are memorized by the processing unit 26 and serve for controlling and correcting the foaming operation of the subsequent cabinet.

It is clear therefore, from what has been described and shown in the accompanying drawings, that the invention refers to a method for foaming cabinets and doors of refrigerators, freezers and the like, which makes use of a microprocessor-controlled system for controlling the important parameters of the process and for demolding or discharging the cabinets after each foaming operation, in relation to the value reached by one or more parameters of the process itself, intervening from time to time in order to automatically correct or modify, so as to bring the foaming process back as close as possible to the foaming conditions considered as optimal, thus ensuring greater utilization of the foaming plants and the production of insulations with uniform characteristics.

What is claimed is:

1. A method for producing insulation comprised of foamed plastic materials in structures such as cabinets and doors of coolers characterized by spaced apart outer and inner walls, comprising the steps of:

feeding a metered quantity of a foamable mixture into the spaces between the outer and inner walls of such structures positioned in a foaming jig; letting the foamable mixture expand until it fills the aforesaid spaces;

sensing change in value for at least one of the foaming process parameters and memorizing data in a data processing unit during each foaming operation;

comparing said sensed parameter with a reference parameter memorized in the data processing unit, and emitting a control signal by said data processing unit to control the removal of the structure from the foaming jig, after the sensed value of said at least one process parameter has undergone a variation of a pre-established quantity with respect to a reference value of said reference parameter.

2. A method as claimed in claim 1, in which said foaming process parameters, are selected from the following ones: the pressure exerted by the foam on the walls of the structure; the peak value of said pressure; the temperature of the structure; the temperature of the foaming jig; and the metered amount of the foaming mixture fed into the structure.

3. A method as claimed in claim 1, comprising the step of changing the process value of said foaming process parameters for a subsequent foaming operation, in relation to the process value of the same parameter obtained during at least one previous foaming operation.

4. A method as claimed in claim 1, comprising the step of emitting a control signal by said processing unit to cause the structure to be unloaded from the jig after the pressure value exerted by the foam on the walls has been reduced by a pre-established quantity with respect to a reference pressure value.

5. A method as claimed in claim 1, comprising the step of emitting a control signal by said processing unit to cause the structure to be unloaded from the jig after the pressure value exerted by the foam on the walls has decreased by a pre-established quantity in percentage with respect to the peak value of the foam pressure.

6. A method as claimed in claim 3, further comprising the step of changing the metered quantity of the mixture fed into the structure, in relation to the maximum pressure reached by the foam in a previous foaming operation.

7. A method as claimed in claim 6, in which a metered quantity of mixture including a packing or extra amount of mixture is fed into the structure, said method further comprising the step of changing said extra amount of mixture for a foaming operation subsequent to a previous one corresponding to changes in the pressure value of said previous foaming operation with respect to a reference pressure value memorized in said data processing unit.

8. A method as claimed in claim 7, further comprising the step of controlling the packing degree of the structure, by comparing peak pressure of the foam, with said reference pressure valve.

9. A method as claimed in claim 7, comprising the step of controlling the packing degree of the structure by comparing the peak pressure on the pressure of the foam at the moment of discharging the structure from the foaming jig with said reference pressure valve.

10. A method as claimed in claim 3, further comprising the step of changing the metered quantity of the mixture in relation to the maximum temperature reached by the structure or the jig.

* * * * *